(12) United States Patent
Ikunami

(10) Patent No.: US 8,302,925 B2
(45) Date of Patent: Nov. 6, 2012

(54) CLOSABLE TYPE DISPLAY APPARATUS

(75) Inventor: Takahiro Ikunami, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 268 days.

(21) Appl. No.: 12/600,634

(22) PCT Filed: Apr. 17, 2008

(86) PCT No.: PCT/JP2008/001016
§ 371 (c)(1),
(2), (4) Date: Nov. 17, 2009

(87) PCT Pub. No.: WO2009/008119
PCT Pub. Date: Jan. 15, 2009

(65) Prior Publication Data
US 2010/0163697 A1     Jul. 1, 2010

(30) Foreign Application Priority Data

Jul. 10, 2007  (JP) ................................. 2007-181108

(51) Int. Cl.
*A47H 1/10* (2006.01)
*B60R 7/00* (2006.01)
(52) U.S. Cl. ..................... 248/324; 248/213.1; 248/917; 296/37.8
(58) Field of Classification Search ............. 248/220.21, 248/220.22, 221.11, 917–924, 213.1, 224.7, 248/320, 324, 917–924; 348/836, 837; 296/37.8, 296/37.7; 361/679.06, 681–683; 349/56, 349/58
See application file for complete search history.

(56) References Cited

U.S. PATENT DOCUMENTS

| | | | |
|---|---|---|---|
| 6,124,902 A * | 9/2000 | Rosen | 348/837 |
| 6,364,390 B1 * | 4/2002 | Finneman | 296/37.7 |
| 6,529,123 B1 * | 3/2003 | Paul, Jr. | 340/425.5 |
| 7,871,115 B2 * | 1/2011 | Vitito et al. | 296/37.8 |
| 2002/0149708 A1 * | 10/2002 | Nagata et al. | 348/837 |
| 2006/0124816 A1 | 6/2006 | Okahara | |
| 2006/0288376 A1 * | 12/2006 | Vitito | 725/75 |
| 2009/0015731 A1 | 1/2009 | Nagami | |
| 2011/0061195 A1 * | 3/2011 | Ikunami | 16/250 |

FOREIGN PATENT DOCUMENTS

| | | |
|---|---|---|
| DE | 11 2006 003 709 T5 | 1/2009 |
| JP | 2002-62815 A | 2/2002 |
| JP | 2002-200941 A | 7/2002 |
| JP | 2004-203300 A | 7/2004 |
| JP | 2005-184478 A | 7/2005 |
| JP | 2006-168402 A | 6/2006 |
| JP | 2006-282100 A | 10/2006 |
| WO | WO-2007/069370 A1 | 6/2007 |

OTHER PUBLICATIONS

German Office Action for corresponding Application No. DE 11 2008 001 538.4, dated Aug. 27, 2012.

* cited by examiner

*Primary Examiner* — Tan Le
(74) *Attorney, Agent, or Firm* — Birch, Stewart, Kolasch & Birch, LLP

(57) ABSTRACT

A display unit has upright sections provided in the vicinity of the right and left ends of a rotating shaft, a bearing supporting member has a supporting piece section for attaching a bearing of the rotating shaft and an attaching piece section with respect to a base plate, formed at an end of the supporting piece section in the direction perpendicular thereto, and a positioning structure for positioning the bearing supporting member with respect to the display unit is provided between the supporting piece section and the upright section in the vicinity of the rotating shaft.

9 Claims, 4 Drawing Sheets

CLOSABLE TYPE DISPLAY APPARATUS

TECHNICAL FIELD

The present invention relates to a closable or retractable type display apparatus having a structure for reducing the influence caused by the vibration of an automobile vehicle.

BACKGROUND ART

On-vehicle closable type display apparatuses include a display apparatus attached on the ceiling of an automobile vehicle, as shown in FIG. 4. In the display apparatus, a display panel 10 is drawn and raised from the side of the ceiling, and is rotated through a suitable angle to be held at the position in service, thus enabling an occupant at a rear seat to see images on the display panel. The display panel 10 is rotated and returned to the side of the ceiling, and is housed to be held at the position out of service, thus causing the panel not to obstruct the view, and also not to be damaged on the display surface by being accidentally touched. In general, an opening and closing structure for such operation has a structure where a rotating shaft having the display panel 10 fixed thereon is rotatably supported by a bearing supporting member secured on the side of a ceiling.

Meanwhile, this type of closable display apparatus has a problem of an influence caused by the vibration of a vehicle. As an example of the measures thereagainst, there is a technology (e.g., see Patent Document 1), in which an engaging groove is provided along the outer surface of the generally central portion of a rotating shaft supporting a display panel on the sides of both the ends of the panel; moreover, a tension plate is provided, which extends vertically from a fixed base provided on the ceiling of the room of a vehicle or the like; a U-shaped pawl provided at the tip of the tension plate is engaged in the engaging groove provided along the rotating shaft; and thereby the rotating shaft axially moved by the vibration is arranged to be returned to the original position by the elastic force of the tension plate. According to the document, when the technology is applied, an axial load imposed on the rotating shaft by the vibration of the display panel existing in an opened state can be suppressed, retainers such as C rings or E rings for preventing the shaft from coming off can be prevented from being dislodged by the vibration load, and the rotating shaft can be prevented from falling out of a bearing supporting member.

Patent Document 1: JP-A-2004-203300 (FIG. 6 and FIG. 7)

In a conventional closable type display apparatus as disclosed in Patent Document 1, a rotating shaft is held against axial displacement imposed thereon by vibration with the elastic force of a tension plate, and thus the display apparatus has a limitation to such vibration having a large amplitude as causes the swing of the display panel, which may influence the image. Further, in the conventional structure, there is a problem that the number of man-hours increases in providing grooves along the rotating shaft, adding members for the tension plate, assembling the members, and adjusting the assembled members, and this can become a factor of increased cost.

In particular, when the display panel is in an opened state, the rotating shaft at the upper edge of the panel is supported by the bearing supporting member only at two points of both the ends thereof, and thus the vibration axially produced is transmitted to the bearing supporting member in cooperation with the weight (e.g., 1 kg) of the display panel hanging down, as a heavy load. As a result, there occurs a problem that the bearing supporting member is axially bent to cause the display panel to be swung, thus making the image hard to see. For example, keeping on watching the swinging images sometimes causes an occupant to get seasick. Further, when the display panel is in a closed state, there is a problem that the clearance between the display panel and the panel housing section is not maintained uniform to deteriorate the appearance of the display apparatus.

The present invention has been made to solve the above-mentioned problems, and an object of the present invention is to provide a closable type display apparatus capable of preventing the display panel from being swung by the vibration of a vehicle in service.

DISCLOSURE OF THE INVENTION

The closable type display apparatus according to the present invention is a closable type display apparatus where a display panel has a rotating shaft fixed thereto, the two ends of the rotating shaft each are attached with a bearing supporting member, the two bearing supporting members are secured to a base plate, and the display panel is rotated with the rotating shaft as a fulcrum to be taken out from or put in a panel housing section of a display unit, which is secured to the base plate, thus placing the display panel in an opened state or a closed state, wherein the display unit has two upright sections provided about the vicinity of the right and left ends of the rotating shaft, respectively; wherein the bearing supporting member has a supporting piece section for attaching a bearing of the rotating shaft and an attaching piece section with respect to the base plate, formed at an end of the supporting piece section in the direction perpendicular thereto; and wherein a positioning structure for positioning the bearing supporting member with respect to the display unit is provided between the supporting piece section and the upright section in the vicinity of the rotating shaft.

According to the present invention, the load produced in a direction axially of the rotating shaft by the vibration caused by the travel of a vehicle is arranged to be imposed also on the side of the upright section through the positioning structure. Thus, the force is distributed and thereby the bearing supporting member is prevented from being bent, which enables the display panel to be prevented from being swung. Furthermore, the clearance between the display unit and the display panel in a closed state can be maintained uniform, and thus deterioration in the appearance can be also eliminated.

BEST MODE FOR CARRYING OUT THE INVENTION

Embodiments of the present invention will now be described with reference to the accompanying drawings in order to explain the present invention in more detail.

First Embodiment

Figure 1:
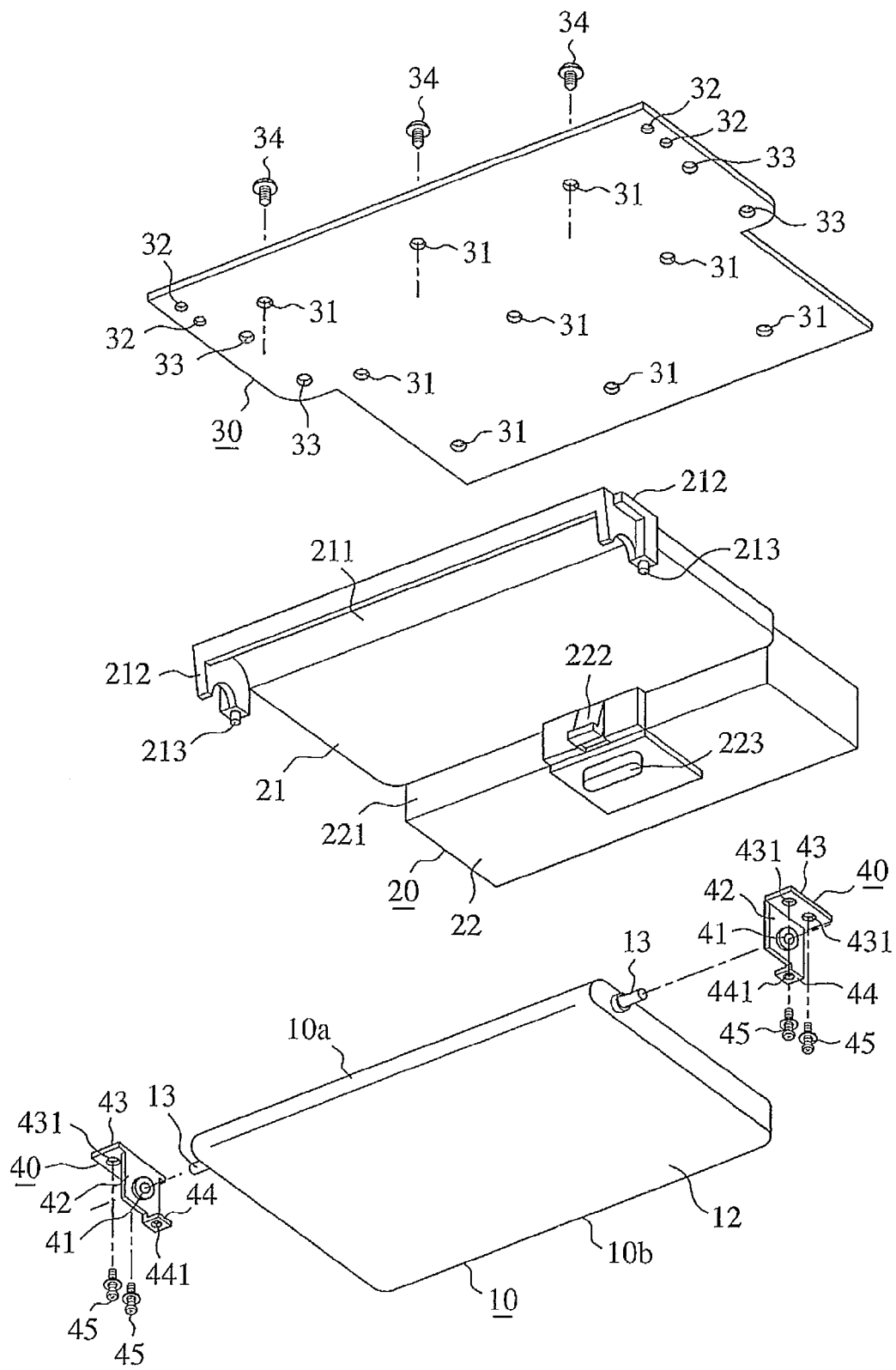
FIG. 1 is an exploded view of a closable type display apparatus in accordance with the first embodiment of the present invention.
Figure 2:
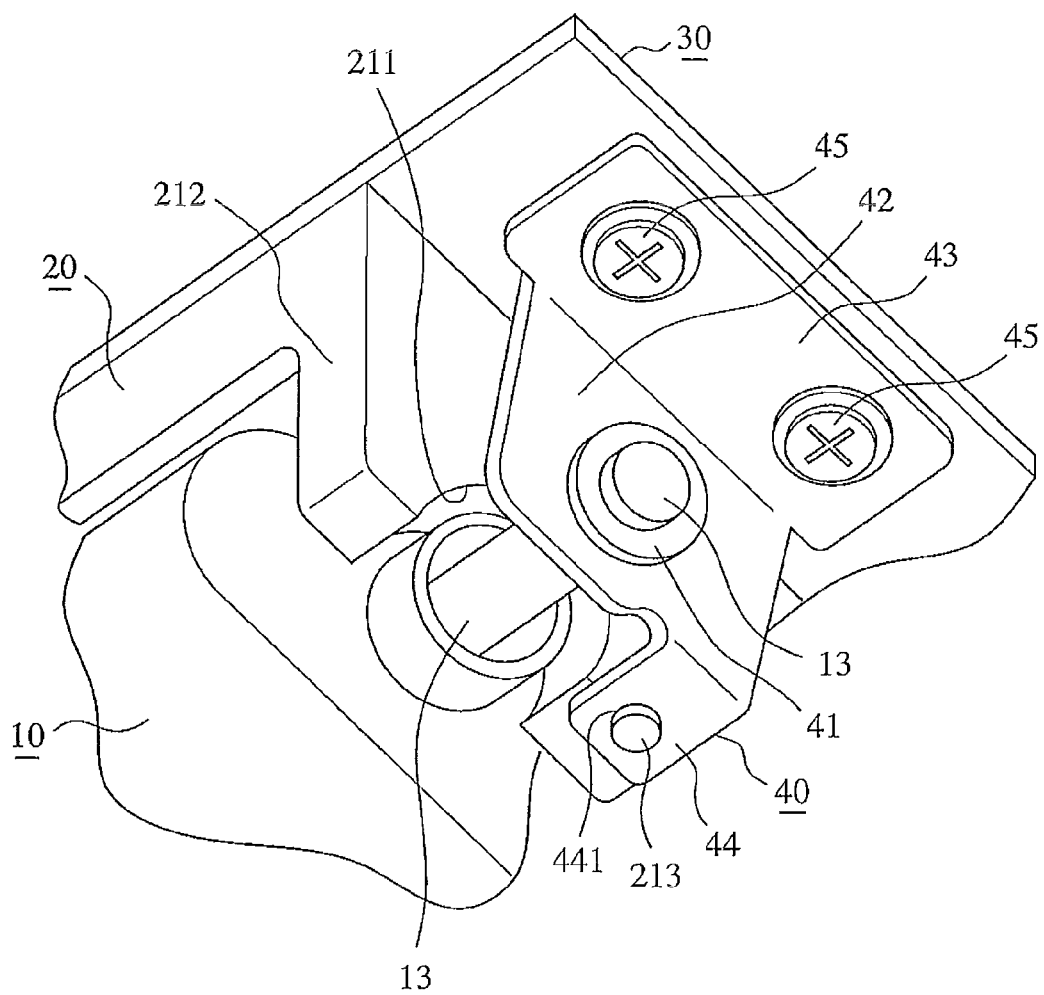
FIG. 2 is a perspective view showing the assembled structure of a bearing supporting member in accordance with the first embodiment of the present invention.
Figure 3:
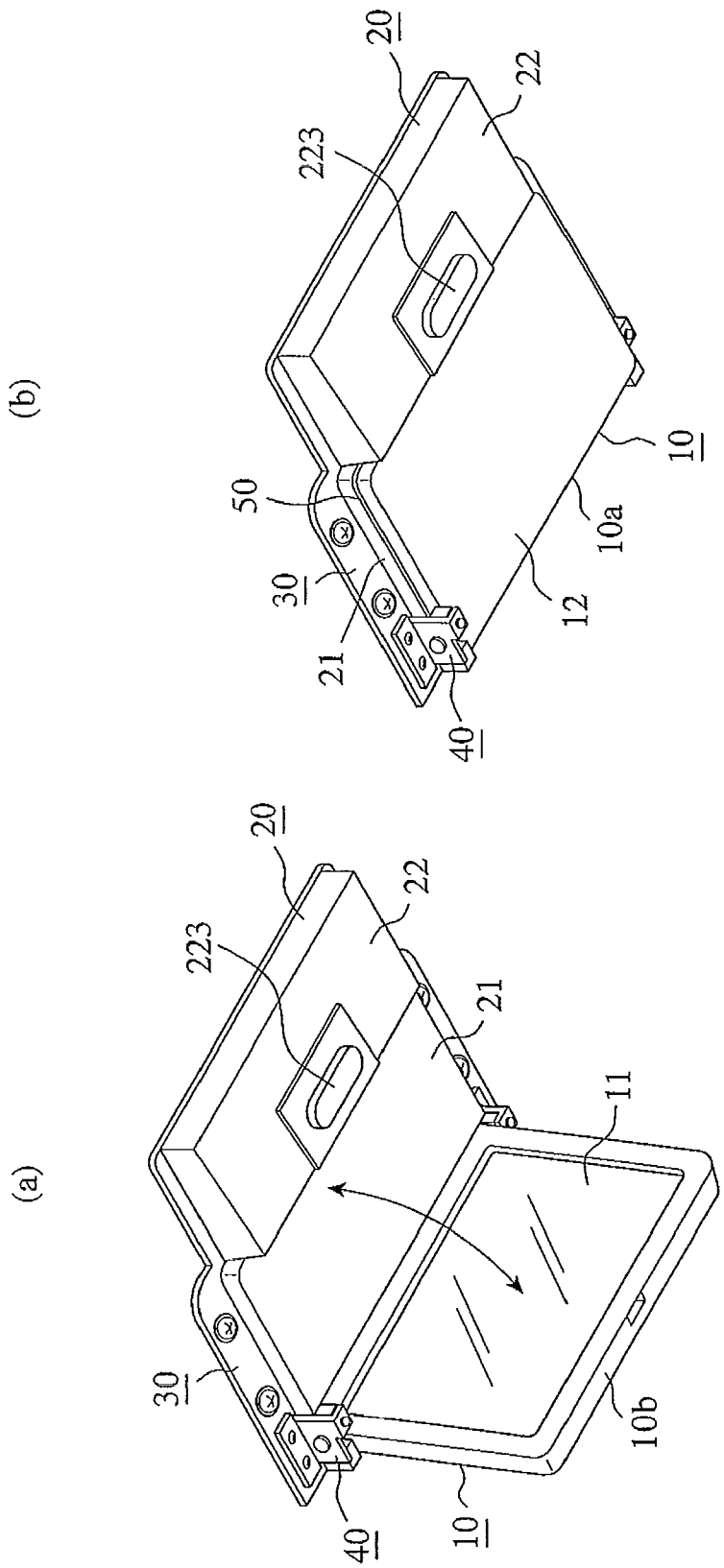
FIG. 3 is a perspective view showing a state where the closable type display apparatus in accordance with the first embodiment of the present invention is mounted on a vehicle.
Figure 4:
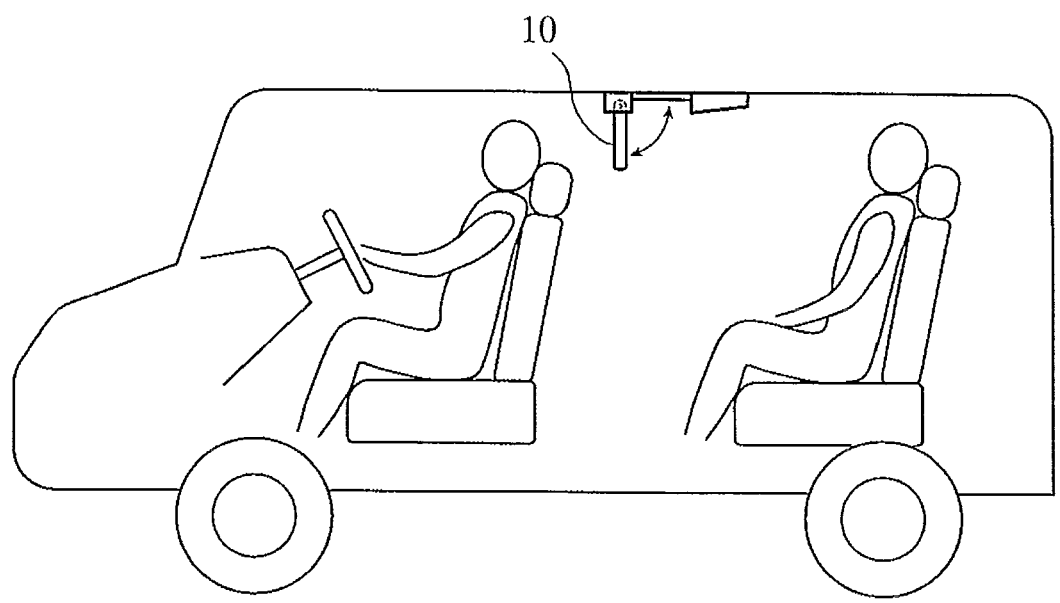
FIG. 4 is an explanatory view showing a state where a closable type display apparatus is used.

FIG. 1 is an exploded view of a closable or opening/closing type display apparatus in accordance with the first embodiment of the present invention. FIG. 2 is a perspective view showing the assembled structure of a bearing supporting member in accordance with the first embodiment of the present invention. FIG. 3 is a perspective view showing a state where the closable type display apparatus in accordance with the first embodiment of the present invention is mounted on a vehicle, FIG. 3 (a) shows the opened state of the display panel, and FIG. 3 (b) shows the closed state of the display panel.

A closable type display apparatus is basically composed of a display panel 10, a display unit 20, a base plate 30, and a bearing supporting member 40. As is well known, the display panel 10 uses one of the surfaces thereof as a display surface 11 where a liquid crystal display or the like is used, and uses the other thereof as a cover surface 12 made of a synthetic resin. Further, the display panel 10 is fixed to a rotating shaft 13 extending along one edge 10a thereof in the lengthwise or longitudinal direction. Therefore, when the rotating shaft 13 rotates, the other edge 10b rotates so as to arc with the shaft 13 as a fulcrum.

The display unit 20 is molded of a synthetic resin, and consists of a panel housing section 21 constituting the housing space of the display panel 10 and an operation box 22 formed integral with the panel housing section 21. The panel housing section 21 includes an arcuate groove 211, which is of arcuate cross section, along the edge in the lengthwise direction opposite from the operation box 22, and is arranged to rotatably receive the edge 10a of the display panel 10. Moreover, the arcuate groove 211 has formed each at both the ends thereof an upright section 212 having, e.g., a U-shaped notch space, formed integral with the display unit 20 so as to straddle the rotating shaft 13. One of the tips of each of the upright sections 212 is provided with a round boss 213 for positioning later described. Each of the round bosses (convexities) 213 is formed so as to be positioned about the periphery of the end of the rotating shaft 13 when the display panel 10 is assembled. In this context, if each of the upright sections 212 can sufficiently endure a load imposed thereon through the bearing supporting member 40 by the vibration later discussed, the upright section 212 may be formed in the shape of one projection that is not bifurcated.

The operation box 22 includes a movement-restraining member 222 energized by an elastic member (not shown) on a side section 221 facing the panel housing section 21. The movement-restraining member 222, when the display panel 10 is housed by the panel housing section 21, enters a rectangular lock hole (not shown) provided in the face of the edge 10b of the display panel 10 to engage its pawl therein, and thereby holds the display panel 10 so as not to be accidentally opened by the self-weight. Meanwhile, the movement-restraining member 222, when the display panel 10 is opened, is arranged to return against the energizing force and release the pawl from the lock hole against the energizing force, by user's pushing an open button 223. Note that the above mechanism is the same as that generally used. In this connection, the operation box 22 has attached thereon a variety of operation keys and a remotely controlling receiver for enjoying images and sounds on the display in addition to the above-described systems; however, those systems do not directly enter into the present invention, and thus both figures and explanation about them are omitted herein.

A base plate 30 corresponds to the chassis of the display apparatus, and is made of a sheet metal. The base plate 30 has provided therethrough insertion holes 31 through which screws 34 for securing the base plate to a predetermined place on the backside of the display unit 20 are passed, screw holes 32 into which screws 45 for fixing the bearing supporting member 40 are threaded, and insertion holes 33 through which screws for securing the display apparatus to the ceiling member of a vehicle are passed. In this context, the display unit 20 may be secured to the base plate 30 from the front side by screws.

The bearing supporting member 40 is made of a sheet metal, and basically has an L shape which consists of a supporting piece section 42 having a hole in which a bearing 41 such as a ball bearing, e.g., is secured and an attaching piece section 43 formed at one end of the supporting piece section 42, perpendicularly thereto. The attaching piece section 43 has insertion holes 431 through which screws 45 for securing the attaching piece section to the base plate 30 are passed. The bearing supporting member 40 recited thus far has a conventional structure; however, according to the present invention, the bearing supporting member 40 further has a lock piece 44 extending in parallel to and in the opposite direction to the attaching piece section 43 at the other end of the supporting piece section 42 of the bearing supporting member, on the side thereof where the attaching piece section 43 is not connected thereto. In addition thereto, the lock piece 44 has provided therethrough a positioning hole (concavity) 441 into which the round boss (convexity) 213 provided on the display unit 20 is comparatively tightly inserted.

Assembly of the above-described members is as follows:

Referring to FIG. 1, first, the screws 34 are passed through the respective insertion holes 31 provided through the predetermined places of the base plate 30 and are screwed into the back side of the display unit 20, thus securing the display unit 20 to the base plate 30. Subsequently, both ends of the rotating shaft 13 assembled in the side of the edge 10a of the display panel 10 are attached in the respective bearings 41 fixed in the corresponding bearing supporting members 40, and the distance between the bearing supporting member 40 and the display panel 10 is adjusted to a previously designed value to fabricate a sub-assembly. Then, the sub-assembly is attached to the panel housing section 21 of the display unit 20. At that time, the round boss 213 provided at one of the tips of each of the upright sections 212 of the display unit 20 is inserted in the positioning hole 441 of the lock piece 44 of the bearing supporting member 40, thus positioning the bearing supporting member 40 (or the bearing 41) with respect to the display unit 20.

After that, each of the screws 45 is passed through the insertion hole 431 of the attaching piece section 43 of the positioned bearing supporting member 40 through a washer, and is screwed into the screw hole 32 of the base plate 30, thus securing the bearing supporting members 40 to the base plate 30. FIG. 2 illustrates the above-discussed state. It is appreciated that the rotating shaft 13 actually has a retainer attached at each end thereof; however, in order to simplify an understanding of the invention, an explanation will be given by omitting the parts. Then, the assembled display apparatus is put at a predetermined position of the ceiling of a vehicle, and is secured to the ceiling by passing the screws through the insertion holes 33 of the base plate 30 and screwing the screws into a predetermined ceiling member. This creates a state where the display apparatus is mounted on a vehicle as shown in FIG. 3. Further, the bearing supporting members 40 and the areas to be attached by the screws are actually finally covered with a cover member for the purpose of design, which is not directly related to the invention; thus, such a covering aspect is discussed by omission in this embodiment.

When the display panel 11 is on use in an opened state as shown in FIG. 3 (a), even if the vibration caused by the travel of a vehicle is transmitted in a direction axially of the rotating shaft 13, the round boss 213 at the tip of the upright section 212 is fastened in the positioning hole 441 of the bearing supporting member 40 in the vicinity of each end of the rotating shaft 13, as discussed above, and thus the load thrown on the bearing supporting member 40 is distributed toward the upright section 212. Therefore, the bearing supporting member 40, which has the load reduced, imposed thereon by the vibration, is not bent, and thus the display panel is prevented from being swung. Further, conventionally, when the display panel 11 is in a closed state as shown in FIG. 3 (b), if the vibration caused by the travel of a vehicle is large, the clearance 50 between the display unit 20 and the display panel 11 becomes nonuniform, which may deteriorate the appearance of the display apparatus. According to the present invention, however, the vibration axially imposed on the rotating shaft 13 is suppressed, and thus the display panel 11 secured to the shaft is restrained from being swung also in a closed state. This enables the clearance 50 to be maintained uniform throughout the periphery of the display panel.

In the above example, the round boss 213 is provided at one of the two tips of the upright section 212 of the display unit 20, and the round bosses 213 of the right and left upright sections 212 are in plane-symmetrical relation to each other. Thus, two types of bearing supporting members 40, which are different to each other in the position of the positioning hole 441, have to be prepared. In order to solve the problem, the round bosses only have to be provided by alternating the tips of the right and left upright sections 212 in positional relation. To be specific, when the round bosses 213 are provided so as to be in point-symmetrical relation to each other, the display unit involves only one type of bearing supporting member, which can reduce the cost. Further, when each tip of the upright section 212 is arranged to be provided with a round boss, the display unit also involves only one type of bearing supporting member 40. When each tip thereof is provided with a round boss, if the width of the lock piece 44 of the bearing supporting member 40 is expanded and the lock piece thereof is arranged to have two positioning holes into which both the round bosses are inserted, the connection between the bearing supporting member 40 and the display unit 20 can be further strengthened.

Further, in the above-discussed embodiment, the lock piece 44, the round boss 213, and the positioning hole 441 constitute a positioning structure for positioning the bearing supporting member 40 with respect to the display unit 20; however, the positioning structure may be a structure where, e.g., the round boss and the member provided with the positioning hole is replaced with each other. The positioning structure only has to be a structure capable of substantially positioning the bearing supporting member 40 with respect to the display unit 20 between the supporting piece section 42 and the upright section 212 in the vicinity of the rotating shaft 13. For this reason, the positioning structure may include an engaging means using other concave and convex structures other than the lock piece 44, the round boss 213, and the positioning hole 441.

As discussed above, in accordance with the first embodiment, the display apparatus is arranged such that the display unit 20 has the upright sections 212 provided about the vicinity of the right and the left ends of the rotating shaft 13 of the display panel 10, respectively; the bearing supporting member 40 has the supporting piece section 42 for attaching the bearing 41 of the rotating shaft 13 and the attaching piece section 43 to be attached to the base plate 30, formed at one end of the supporting piece section 42 in the direction perpendicular thereto; and the positioning structure (e.g., the lock piece 44, the round boss 213, and the positioning hole 441) for positioning the bearing supporting member 40 with respect to the display unit 20 is provided between the supporting piece section 42 and the upright section 212 in the vicinity of the rotating shaft 13. Therefore, the load produced in the direction axially of the rotating shaft 13 by the vibration caused by the travel of a vehicle is thrown also to the side of the upright section 212 through the positioning structure. Thus, the force is distributed, which restrains the bearing supporting member 40 from being bent to enable the display panel to be prevented from being swung. Moreover, the clearance 50 between the display unit 20 and the display panel 11 in a closed state can be maintained uniform, and thus deterioration in the appearance can be also eliminated. Besides, the retainer can be prevented from being disengaged as with the case of the conventional technique. Furthermore, the display unit 20 and the integrally molded bearing supporting member 40, which are hitherto used, only have to be changed in shape. Thus, there is no increase in the number of parts and the number of man-hours for assembly and adjustment, and there are also few factors increasing the cost.

INDUSTRIAL APPLICABILITY

As mentioned above, the closable type display apparatus according to the present invention is suitable for use, e.g., in a on-vehicle display apparatus because the load produced in the direction axially of the rotating shaft by the vibration caused by the travel of a vehicle is arranged to be thrown also to the side of the upright section through the positioning structure, thus enabling the display panel to be prevented from being swung.

The invention claimed is:
1. A closable type display apparatus comprising:
a display panel having a display surface;
a rotating shaft fixed to the display panel, and operating as an axis of rotation of the display panel;
a pair of bearing supporting members attached to both ends of the rotating shaft;
a base plate fixed to the bearing supporting members;
a display unit fixed to the base plate, and housing the display panel therein;
a pair of upright sections formed in the display unit in the vicinity both ends of the rotating shaft;
a supporting piece section formed in each of the bearing supporting members, and configured to attach a bearing of the rotating shaft thereto;
an attaching piece section formed at an end of the supporting piece section in the direction perpendicular to the supporting piece section, and fixed to the base plate; and
a positioning structure configured to position the bearing supporting members with respect to the display unit by connecting the bearing supporting members with the upright sections in the vicinity of the both ends of the rotating shaft.
2. The closable type display apparatus according to claim 1, wherein the positioning structure includes a concave and convex engaging structure connecting the bearing supporting members and the upright sections.
3. The closable type display apparatus according to claim 1, wherein the positioning structure includes:
a round boss provided at a tip of the upright section of the display unit;

a lock piece formed at an opposite end of the supporting piece section from the attaching piece section, and extending in parallel to and in the opposite direction to the attaching piece section; and a positioning hole formed in the lock piece, and into which the round boss is inserted.

4. The closable type display apparatus according to claim 3, wherein each of the upright sections has a pair of tip portions which are provided by forming a notch space having a shape straddling the rotating shaft in the upright section, where one of the pair of tip portions is provided with the round boss.

5. The closable type display apparatus according to claim 3, wherein each of the upright sections has a pair of tip portions which are provided by forming a notch space having a shape straddling the rotating shaft in the upright section, where each of the pair of tip portions is provided with the round boss.

6. The closable type display apparatus according to claim 5, wherein the lock piece of the bearing supporting member has a second positioning hole corresponding to an associated second round boss.

7. The closable type display apparatus according to claim 3, wherein the positioning structure further includes an additional concave and convex engaging structure for connecting the bearing supporting member with the associated upright section.

8. The closable type display apparatus according to claim 1, where the apparatus is mounted in a vehicle; and where each bearing supporting member is configured to avoid deformation and prevent the display panel from being rotated about said fulcrum because of vibration of the vehicle by distributing the vibration to the upright section through the positioning structure.

9. The closable type display apparatus according to claim 1, where the apparatus is mounted in a vehicle, and wherein the base plate has an insertion hole for inserting a member utilized to fix the base plate to the vehicle.

* * * * *